INVENTOR.
Stuart M. Dockerty

ATTORNEY

United States Patent Office 3,410,675
Patented Nov. 12, 1968

3,410,675
GLASS ROD AND TUBE FORMING WITH CONTROLLED DIMENSIONAL UNIFORMITY
Stuart M. Dockerty, Corning, N.Y., assignor to Corning Glass Works, Corning, N.Y., a corporation of New York
Filed Apr. 15, 1965, Ser. No. 448,403
2 Claims. (Cl. 65—129)

ABSTRACT OF THE DISCLOSURE

Glass cane and tubing are formed with improved dimensional uniformity by providing a relatively high head of thermally conditioned glass which extrudes the glass through a sized orifice with a reduced attenuation ratio.

---

At the present time, forming devices, such as cane and tube forming units are integrally connected to a large glass melting tank. As a result, it is necessary that glass cane and tubing be formed only in those plants having facilities to melt glass from raw materials. Economic requirements of such an operation, however, demand high production rates to minimize costs which is not always possible. Then too, shipping of the finished products must be carefully handled since manufacturing areas are often remote from consumer locations.

A further disadvantage of the present processes is the use of molten glass directly from a forehearth, wherein stratification tends to form cold glass on the bottom and hot glass on the top. This condition may cause detrimental effects to occur in tube or cane formed therefrom. That is, the temperature gradients result in deleterious viscosity gradients at the forming orifice. Further, present tube drawing processes depend primarily on gravity for flow rates and may, under normal conditions, rely only upon a head of approximately 10″. Also, draw means are normally required to provide a controlled pull with known devices.

The present invention provides a method of and apparatus for controlling the flow of molten material, such as glass, through conditioning means, such as a substantially vertical tube or tower. The tube keeps heat transfer from the flowing glass to a minimum. Heating elements along the tube provide means for selectively heating the flowing glass, thus allowing thermal equilibrium to be established. The tower acts as a forehearth in controlling the cooling of the glass as it flows to an orifice. The unit provides dimensional accuracy, quick delivery of small quantities of glass, and a flexibility of location since the unit is divorced from a large glass melting tank. An adjustable mandrel and gating means provide for increased speed in replacing orifice portions or changing from one shape of product to another. The unit is designed to form accurate tubing at a low production rate and with a minimum labor of operation.

It thus has been an object of the present invention to provide an improved method of controlling the flow of molten material in a vertical tower of a forming unit.

An additional object of this invention has been to provide a small forming unit which forms accurate cane and tubing at low production rates with minimum labor of operation.

Another object is to lower the attenuation ratio in a forming device.

A further object of the present invention has been to provide a unit which may be placed in areas remote from large melting tanks but close to a consumer's location.

A still further object of this invention has been to develop a unit which is small enough to be placed in some underdeveloped countries and thus aid foreign markets.

Another object of this invention is to provide dimensional accuracy in the finished product, quick delivery of small quantities of molten glass, and flexibility of unit location.

An additional object of the present invention is to provide an improved method of producing cane and tubing with a low attenuation ratio.

A still further object of the present invention has been to provide an increased flow rate through smaller-sized orifice openings.

A further object of the present invention has been to keep heat transfer from the molten glass to a minimum, thereby avoiding temperature variations and viscosity variations in the glass.

These and other objects of the present invention will be more apparent to those skilled in the art from the following disclosure and accompanying drawing in which.

Figure 1:
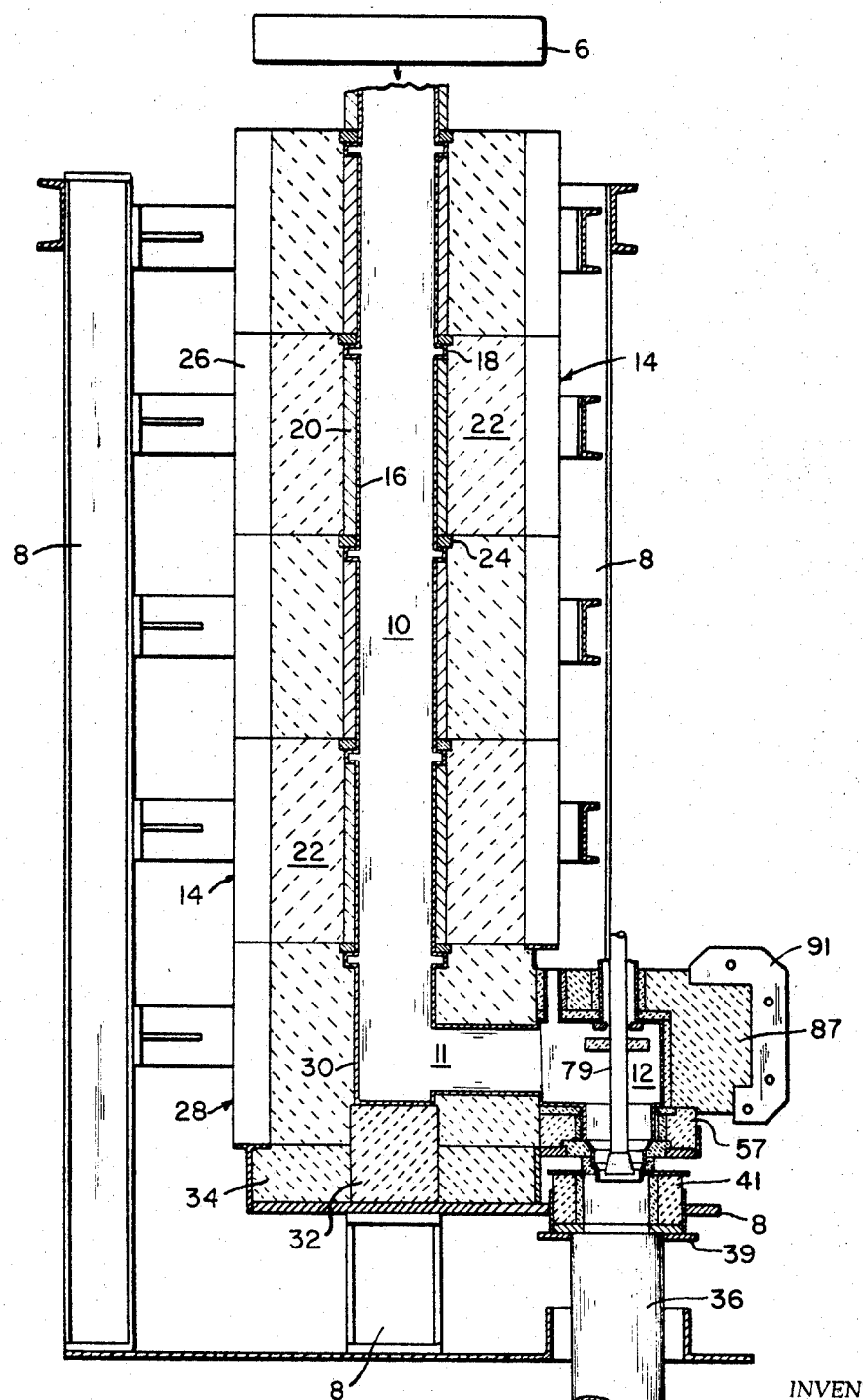
FIG. 1 is a vertical section of a forming device illustrating a tower unit provided with an orifice delivery unit situated in a bowl area.

Referring now to the drawings, a supply 6 of molten materials, such as glass, from a low volume melting furnace or other suitable source is delivered to the inventive device at a specified temperature and viscosity. A superstructure 8, constructed preferably of channel girders, supports the invention disclosed herein. The superstructure 8 relatively supports conditioning means such as tower unit 10, and bowl area 12. The supply of molten materials is delivered to the upper end of the conditioning means 10.

The tower unit is substantially vertically oriented but may be canted, if desired. A series of coaxial stacking modules 14 regulate temperature and pressure; also provide support for the parts thereof and the necessary linkage to the tower unit. The stacking modules have a clamshell configuration and open individually to permit repairs to be made to the individual modules and parts thereof. The modules 14 are individually suitably connected to the superstructure 8 and thus no module rests on an adjacent module.

Each module contains a cylindrical, glass-containing jacket 16 which is made of a suitable metal, such as platinum. An expansion joint 18 is provided in jacket 16, preferably at an extremity, so that the dimensional stability of the jacket will be retained when hot glass flows through the modules causing the jacket to expand longitudinally under this heat. If the glass composition being supplied so permits, the jacket 16 may be constructed of a suitable refractory. Surrounding the jacket 16 and suitably connected thereto is a wound backer 20 which is designed to control the heat transfer to the glass, to add heat to the flowing glass, and to provide thermal equilibrium to the flowing molten glass. A suitable power supply is connected to electrical windings in each backer 20. Suitable sensors control the power supply to each module so as to maintain a constant temperature along the entire column of molten glass. Insulating brick 22 of a suitable material surrounds wound backer 20 and aids in the maintenance of thermal equilibrium. A supporting block 24 is attached to insulating brick 22 and aids the support of the wound backer 20 of the module situated directly above the module containing supporting block 24. A housing 26 of a suitable material, such as sheet metal, surrounds the separate parts which make up the stacking module 14 and maintain the suitably connected parts as a unit. Each module is a separate assembly and no module is connected to any adjacent module. The temperature of the molten glass flowing through each module is sensed, heated and controlled.

In one embodiment of the present invention, transitional means 11 are connected to the lower end of the conditioning means 10. The transitional means 11 in bottom module 28 relatively change the flow of the molten material from a substantially vertical flow to a substantially horizontal flow.

In the bottom module 28, glass-containing jacket 30 is L-shaped and transitions the flowing glass from substantially vertical flow to a substantially horizontal flow. Transition is thus made from tower unit 10 to a bowl area 12. Refractory support block 32 aids in supporting the vertical weight of the glass which is flowing downwardly through the coaxial stacking modules. The support block 32 rests on superstructure 8 and thus the weight of the column of flowing glass is transferred to the supporting structure 8. Bottom refractory block 34 rests on superstructure 8, supports insulating brick 22, and prevents excessive heat transfer from the tower unit 10 to the atmosphere.

Transitional means 11 suitably join the bowl area 12, from which the extrusions are formed. A draft shield 36 may be suitably attached to the bowl area 12 of the device to protect the glass from an abrupt change in temperature as it leaves the bowl area.

Figure 2:
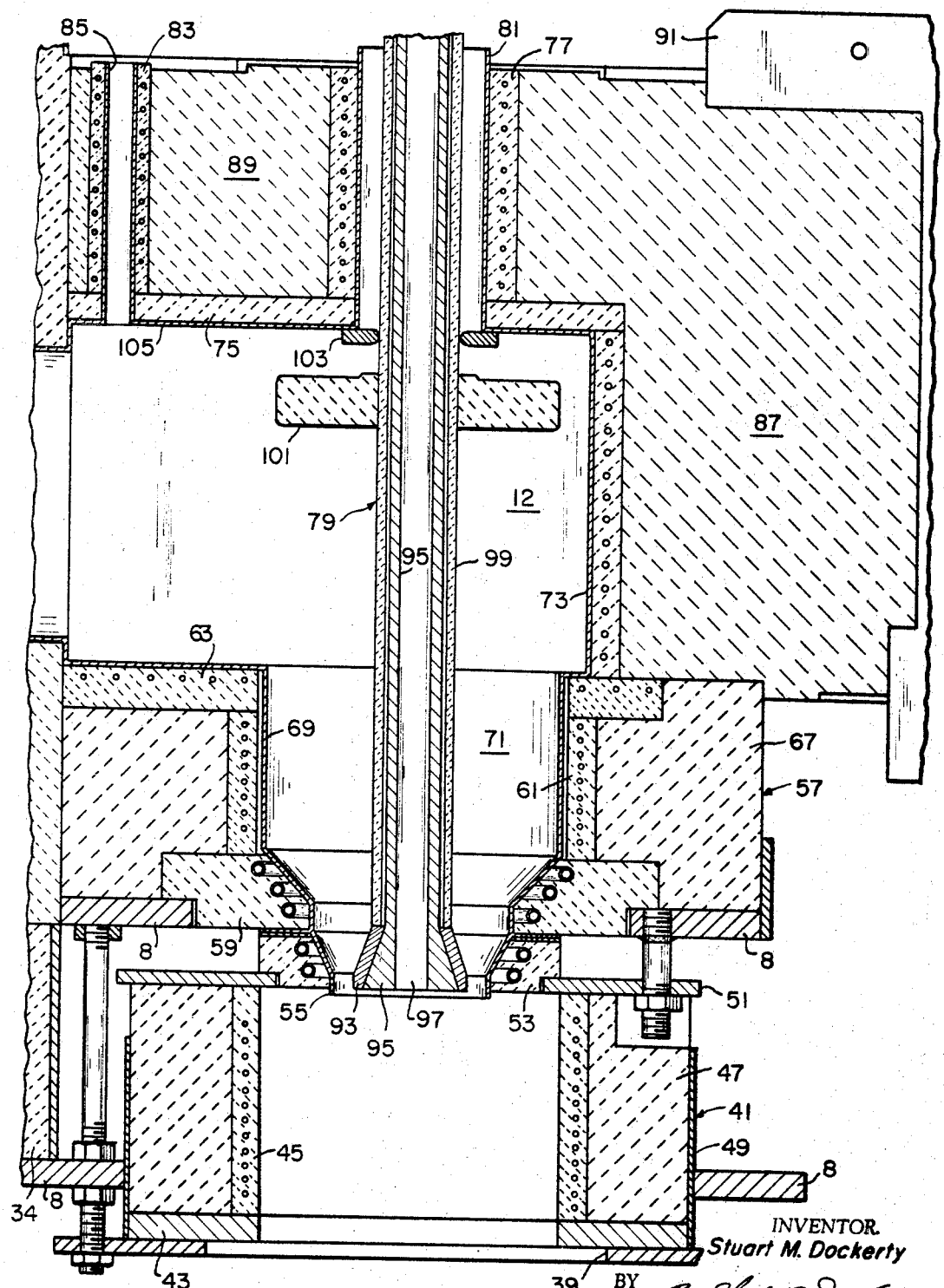
FIG. 2 is a fragmentary, sectional view of the bowl area.

Referring now to FIG. 2, a muffle support 39 is shown suitably connected to superstructure 8 and supporting muffle means 41. A refractory support 43 rests on muffle support 39 and supports heating element 45 and insulating brick 47. The brick 47 surrounds heating element 45 and aids in inhibiting heat transfer to and from the muffle means 41. Jacket 49 surrounds insulating brick 47 and maintains the portions of muffle means 41 as a unit.

The ring holder 51 supports wound orifice-ring backer 53. A suitable orifice ring 55 such as platinum or the like covers the internal surface and top of backer 53.

Superstructure 8 further supports bowl heating means 57. A heating element 59 rests upon the upper surface of wound orifice-ring backer 53 and superstructure 8. A heating backer 61 rests upon the upper surface of heating element 59. Superstructure 8 and heating element 59 support insulating brick 67 which surrounds heating backer 61 and heating element 59. A suitable heating plate 63 rests upon the upper surface of insulating brick 67 and heating backer 61. The heating plate 63 aids in maintaining the shape of bowl 71 when subjected to the elevated temperature of molten glass. A liner 69 such as platinum or the like, rests upon the upper surface of the plate 63 and snuggly lines bowl 71 formed by heating plate 63, heating backer 61, and heating element 59. Units 45, 53, 59, 61 and 63 are wound individually with coils and connected to a suitable source of power. The temperature of the molten glass in each unit is controlled by suitable sensors which activate the sources of power.

A wound backer 73 is supported by heating plate 63, and not only adds heat when necessary to the bowl area 12, but also forms the end wall of bowl area 12. A roof backer 75 is supported by both wound backer 73 and superstructure 8. A heatable tunnel element 77 is supported by roof backer 75 and provides a passageway for adjustable mandrel 79. The tunnel element 77 is skinned with a liner 81 of a suitable material, such as platinum.

A wound vent tube 83 is supported by the roof backer 75 and is snuggly coated with a suitable liner 85 to vent air from the bowl area 12 when the bowl area 12 is filling with molten material. The elements 73, 77 and 83 are individually wound with electrical windings and individually connected to a suitable power supply. A constant temperature is maintained in the flowing glass by individual sensors to control the power supply.

A refractory backer 87 is supported on insulating brick 67 and surrounds wound backer 73. A portion of the roof backer 75 and a portion of the heatable tunnel element 77 limit heat losses from the bowl area.

A refractory backer 89 is supported by roof backer 75 partially surrounds heatable tunnel element 77 and wound vent tube 83 to limit heat losses not only from bowl area 12, but also from wound vent tube 83 and heatable tunnel element 77.

A corset 91 is affixed to superstructure 8 and aids in maintaining the integrity of the parts which when assembled form bowl area 12.

By adjusting the vertical position of mandrel 79, tubing or cane can be made depending on the position and operation of mandrel 79 with respect to orifice ring 55. The mandrel 79 is substantially vertically positioned in bowl 71 and its position is adjustably fixed to the superstructure by suitable changing means. A bell 93 on the lower end of mandrel 79 controls the internal diameter of tubing being produced. The bell 93 is supported by an internal mandrel portion 95. A blow hole 97 through internal mandrel portion 95 provides a passageway through which a steady flow of air is maintained. This flow of air creates a draft through the bore of tubing formed and cools the inside surface of said bore as the tubing is formed.

A cylindrical refractory outer liner 99 rests upon the bell 93 and surrounds internal mandrel portion 95 such that an air space exists between refractory outer liner 99 and internal mandrel portion 95. The liner and mandrel are arranged in a spaced, concentric relationship. The ring 55 and adjusting mandrel 79 coact as forming means or extruding means.

A gate or stopper 101 is suitably attached around adjustable mandrel 79. By lowering adjustable mandrel 79, gate or stopper 101 enters bowl 71 in such a manner so as to cut off the flow of molten material through bowl 71. When flow is stopped adjustments and repairs can be made to the device. A centering device or fulcrum 103 is suitably attached to a roof liner 105 of the bowl area 12. The roof liner 105 of platinum or the like is shown attached to roof backer 75. The device 103 aids in the adjustment and positionment of internal diameter, and in the maintainance of uniform wall thickness of the tube being produced.

Thus this invention provides a straight well feeder and forming unit depending on gravity feed. The tower or tube acts as a forehearth by controlling the heat transfer to and from the flowing molten material as it flows to the orifice in the forming unit. A flowing material, such as glass, can be heated as desired. Flow is relatively low and head is relatively high. The high head and long path of flow allow the glass to come to thermal equilibrium and homogeneity before being delivered to the well for forming. In a preferred embodiment the glass head may be about 100 inches.

Means for heating are provided having sectionally replaceable portions. Cylindrical glass-containing jackets within the sectionally replaceable portions are preferably made of platinum or its alloys, but may be of refractory. Expansion joints are provided to compensate for the longitudinal expansion of the metallic jacket when it is subjected to high temperatures.

In presently known tube making operations molten glass is delivered to the forming device directly from a forehearth. In this type of flow, cold glass travels along the bottom of the forehearth and hot glass travels along the top. Thus in known forehearths temperature variations exist in the glass being delivered to the forming unit. Different temperatures cause defects in the products being produced.

To attain symmetrical flow in a circular or annular orifice, it is necessary to have a uniform temperature around paths of constant radius in the orifice. It is even more advantageous to also have a constant temperature along radial lines. The present invention provides such uniform temperatures in the orifice.

This invention, providing a high head and a long flow path, allows the flowing glass to come to thermal equilibrium. The vertical tube keeps the heat transfer from the glass to a minimum thereby avoiding temperature variations in the glass. Temperature gradients, if present, may result in viscosity gradients at the orifice.

An adjustable mandrel provides increased accuracy and dimensional stability to tubing being produced. The adjusting mandrel also controls siding.

The unit provides dimensional accuracy and quick delivery of small orders. Since the unit is divorced from a large melting tank and forehearth there is much flexibility of location.

For production of cane and tubing this invention lowers attenuation ratio. The lower attenuation ratio increases accuracy and cuts down variations in the various product parameters.

In a tube or cane operation the shaped products issuing from the orifice are drawn away from the orifice. Any dimensional variation becomes more noticeable as stretching occurs due to this drawing. Product dimensional stability is necessary in such factors as outside diameter and, in the case of tubing inside diameter and wall thickness. Siding is another defect which often occurs in tubing. Siding may be defined as a condition whereby, when viewing a horizontal cross-section of a portion of tubing, the outside diameter and inside diameter or bore do not form concentric circles. This eccentricity establishes a variation in the wall thickness of the tubing at this particular section. Thus the tubing has nonconcentric inner and outer surfaces.

In a preferred embodiment, glass flow is about one pound per minute. With such flow there is a negligible resistance to flow and relatively little loss of head. Control of a system is easier where a relatively large head is available. This embodiment provides about 100 inches of head as compared with approximately 10–18 inches head in normal known forehearths. The invention equalizes glass temperature and minimizes temperature variations at the orifice. The adjustable mandrel allows universal movement of the mandrel to any desired position with respect to the orifice ring. Such adjustment is used primarily for siding control, however, deliberate siding may be effected when desired.

If desired, the flow of the molten material would not have to be transitioned from a vertical flow in the tower to a horizontal flow, but could continue directly from the vertical tower into a bowl situated directly under the tower without any relative change of direction. In such a situation, hollow extrusion could be formed by utilizing a bell having suitable linkage.

Figure 3:
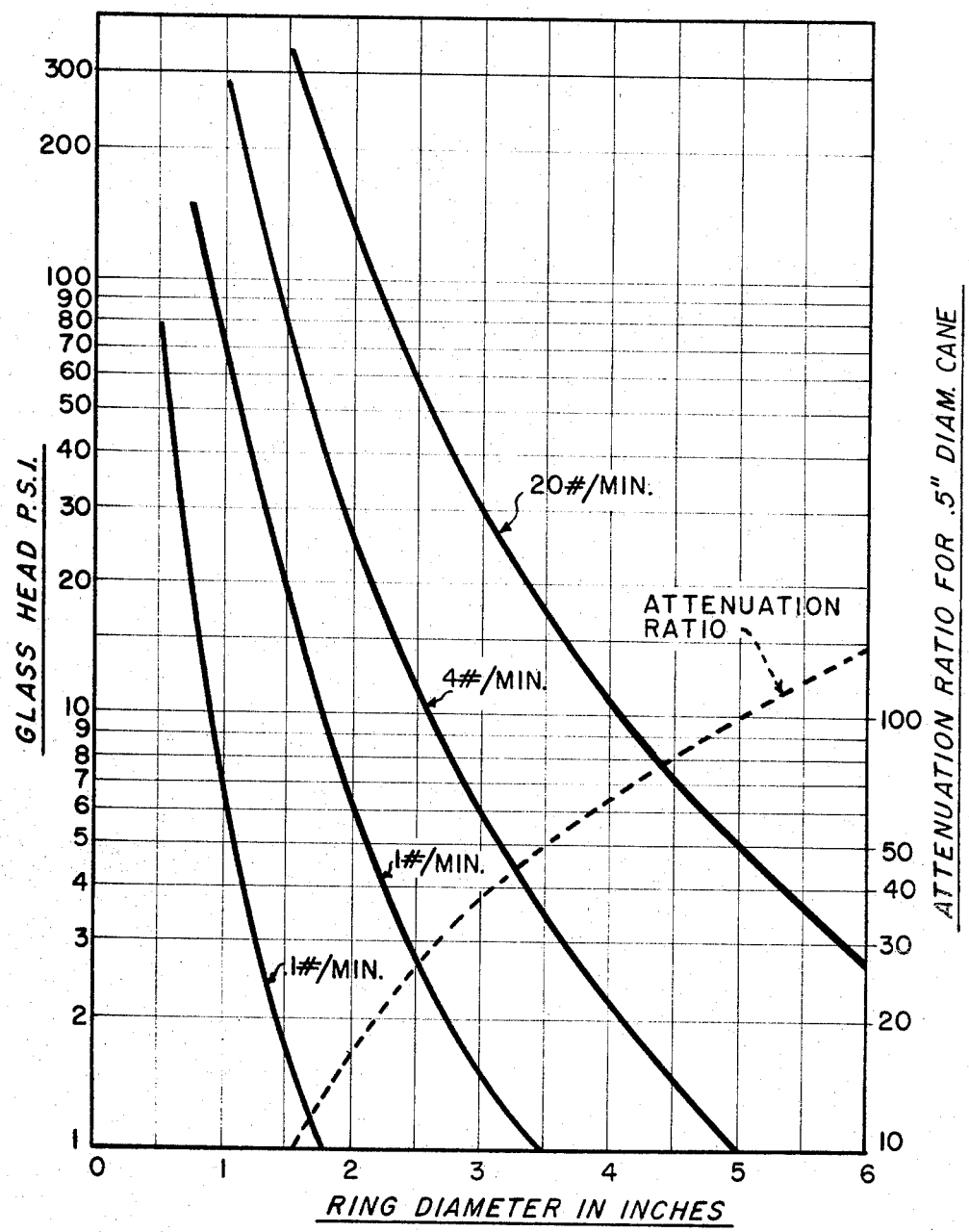
FIG. 3 is a graphical aid to the full disclosure of the invention.

FIGURE 3 is a graphical representation of the effect of attenuation ratio on glass head. The parameters chosen for this example are viscosity $3 \times 10^4$ poises at 1050° C., bell ring ratio .6575, tubing size ½″ outside diameter and wall .035 inch. The graph thus is for one specific product. The purpose of the chart is to compare the change in attenuation ratio (therefore diameter variation) as affected by change in head for these specific conditions.

In explaining this example, R is defined as the attenuation ratio. The device is so constructed that a parabolic flow pattern exists and thus a mean or average value for velocity may be used.

The velocity at the orifice is $v_0$, $v_1$ is the velocity of a pulling machine and Q is the rate of flow in pounds per minute. The viscosity of the flowing material at the orifice determines $v_0$. When the molten glass flows from the orifice it has a cross-sectional area of $A_0$. As the tubing is stretched by the pulling machine or gravity and cooled at the same time, the cross-sectional area of the tubing diminished until the glass is set and no longer stretches. When the glass no longer stretches the cross-sectional area is represented by $A_1$. Flow is expressed by the equation $Q = A_0 v_0 = A_1 v_1$. The attenuation ratio is expressed by the equation $$R = \frac{v_1}{v_0} = \frac{A_0}{A_1}$$

The attenuation ratio also applies to the production of cane. When stretching glass viscously, a variation in the viscosity of glass emerging from the orifice in any such process exists as part of the drawing operation itself. This variation in the viscosity of the glass at the orifice may be expressed by the equation $\Delta \eta_0 / \eta_0$, where $\eta_0$ is the orifice viscosity.

D is orifice diameter, $D_0$ is the diameter of the cane at the orifice and $D_1$ is the diameter of the cane at the instant the cane no longer stretches. $\Delta D$ is a change in diameter and $h$ is head in p.s.i. A variation in the diameter of two rods, that is, a dimensional change may be expressed as $\Delta D / D_1$.

In the production of cane from the instant device the attenuation ratio, $$R = \left(\frac{D_0}{D_1}\right)^2$$

When viscous flow theory is applied to $$R = \left(\frac{D_0}{D_1}\right)^2$$

the formula becomes $$\frac{\Delta \eta_0}{\eta_0}(\sqrt{R-1}) = \frac{\Delta D}{D_1}$$

Thus a variation in attenuation ratio is reflected by a variation in the diameter of various rods which no longer stretch and have reached their ultimate diameter.

For example, with a one percent variation in viscosity and an attenuation ratio of 225, a 14% variation in rod diameter results. If the variation in viscosity remains at 1% but the attenuation ratio is reduced to 25, a 4% variation in rod diameter results. Therefore, when stretching glass viscously the more the glass is stretched, the more dimensional variation will result for a given viscosity variation. Less dimensional variation in the products decreases the amount of waste products.

One solution to reduce attenuation ratio would be to reduce $A_0$. However, reducing $A_0$ greatly reduces the flow rate or production rate which varies approximately as $D^{3.5}$ when cane is being produced.

The instant invention provides a more practical solution by increasing the head over the orifice and producing a high flow rate. The high head pushes the flowing molten material through the orifice. Further, the instant invention reduces the attenuation ratio by decreasing $A_0$ but at the same time it brings the production rate to normal by a large increase in pressure head. In practicing the present invention, a head is maintained according to the relationship of $Q/KD^{3.5}$, where K is a constant dependent on glass variables, units of the factors used, diameter of the orifice and the like.

FIGURE 3 shows the relationship of head, flow rate, ring size, and attenuation ratio for one specific set of parameters previously noted herein. To use the graph, select a head value and flow rate value as desired. From the interrelationship of the selected values of head and flow rate a suitable ring size is determined. From the ring size attained thereby, a corresponding attenuation ratio is indicated.

An example will clarify how the graph is used. By selecting a glass head of one p.s.i. and a flow rate of four pounds per minute, the ring size indicated is approximately 5 inches diameter. The corresponding attenuation ratio indicated is approximately 100. By increasing the head to 100 p.s.i. and maintaining a flow rate of four pounds per minute, the ring size indicated is approximately 1.34 inches diameter. The corresponding indicated attenuation ratio is approximately 7.2. Therefore, by increasing head to 100 p.s.i. the attenuation ratio has been reduced about 14 times.

The following example is presented to illustrate the invention. It should be understood that this example is not intended to limit the invention and that obvious changes may be made by those skilled in the art without changing the essential characteristics and basic concept of the invention In the example run, the temperature of the glass in the inventive apparatus was 970° C. and glass viscosity was 400,000 poises. The head of glass was 120 inches and the flow rate was 45 pounds per hour. A pulling device was used and .570 diameter tubing was produced from a 3 inch diameter ring with a 2.25 inch diameter bell. The attenuation ratio for this example was 5.25.

Thus the present invention provides increased flow through decreased orifice sizes by making use of a reduction in the attenuation ratio. The present invention also provides an improved method for controlling the flow of molten material in a column of molten glass and selectively controls heat transfer through replaceable units. The controlled heat transfer avoids temperature variations and viscosity variations in the glass as it is delivered to the orifice for forming glass shapes.

Although the present invention has been described with respect to specific details of certain embodiments thereof, it is not intended that such details be limitations upon the scope of the invention except insofar as set forth in the following claims:

I claim:

1. A method of producing a cylindrical glass article by forcing molten glass through an orific wherein the improvement comprises, providing a head of at least about 100 inches of molten glass, flowing such molten glass downwardly while maintaining a substantially constant head of glass, circumferentially heating the molten glass as it flows downwardly to provide radial temperature uniformity therewithin, directing the path of the downwardly flowing molten glass to a delivery area, and extruding such thermally conditioned glass through a sized orifice solely under the pressure exerted by said head of molten glass, and maintaining an attenuation ratio of below 25 to produce a dimensionally uniform cylindrical article.

2. Apparatus for forming cane and tubing having dimensional uniformity from molten glass which comprises, a plurality of vertically oriented juxtapositioned conditioning means each having a tubular passage in vertical coaxial communication with one another means individually connecting said plurality of conditioning means to a common superstructure for facilitating the individual replaceability thereof, means for individually applying heat to the tubular passage of each said conditioning means, orifice means communicating with the tubular passage of the lowermost of said vertically oriented conditioning means for extruding molten material therefrom responsive to the head of such material maintained within the combined height of the vertically communicating tubular passages, said heat applying means including a heatable backer wound with electrical coils surrounding the tubular passage of each conditioning means, said conditioning means including a plurality of selectively replaceable portions of clamshell configuration, said tubular passage being provided with a cylindrical jacket portion having an expansion joint at an extremity thereof, bowl means containing said orifice means and horizontally positioned with respect to said lowermost conditioning means for maintaining molten glass at a uniform temperature prior to flowing through said orifice means, and transitional means communicating between the passage of said lowermost conditioning means and said bowl means for transitioning the vertical flow of molten glass from said conditioning means to said bowl means for supplying said orifice with molten glass.

References Cited

UNITED STATES PATENTS

| | | | |
|---|---|---|---|
| 3,078,695 | 2/1963 | Kozak et al. | 65—187 |
| 3,244,495 | 4/1966 | Apple et al. | 65—356 |
| 3,334,981 | 8/1967 | Glaser | 65—1 |

DONALL H. SYLVESTER, *Primary Examiner.*

E. R. FREEDMAN, *Assistant Examiner.*